A. E. PAIGE.
MULTIFOCAL OPTICAL ELEMENT.
APPLICATION FILED APR. 1, 1915.
1,271,356.
Patented July 2, 1918.
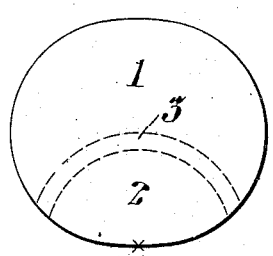
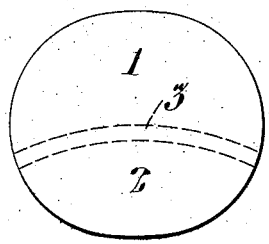
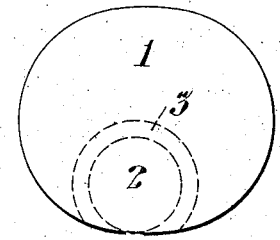
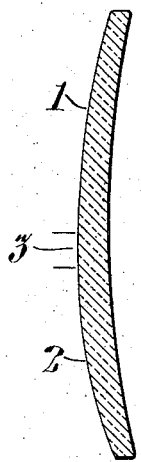
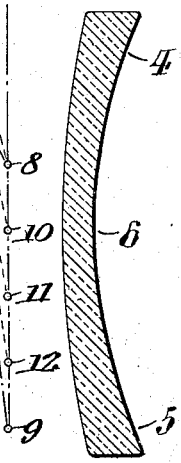
WITNESSES:
INVENTOR:

UNITED STATES PATENT OFFICE.

ARTHUR E. PAIGE, OF PHILADELPHIA, PENNSYLVANIA.

MULTIFOCAL OPTICAL ELEMENT.

1,271,356.   Specification of Letters Patent.   Patented July 2, 1918.

Application filed April 1, 1915. Serial No. 18,435.

*To all whom it may concern:*

Be it known that I, ARTHUR E. PAIGE, a citizen of the United States, residing at Philadelphia, in the State of Pennsylvania, have invented a certain new and useful Improvement in Multifocal Optical Elements, whereof the following is a specification, reference being had to the accompanying drawing.

My invention is particularly applicable to ophthalmic lenses formed of a single piece of glass of uniform index of refraction and designed to afford different correction for vision at different distances. Ordinarily, such lenses are merely bifocal, including a major area, of uniform focus, adapted for distant vision, and a minor area, of different but uniform focus, adapted for near vision; said areas immediately adjoining each other and having a distinct line of division between them; said line being manifested either by an offset ledge, formed by the abrupt termination of the respective focal areas in different planes, or by a ridge at the junction of said surfaces in a plane common to both of them. All such lenses of the prior art produce aberration of vision through the region of the junction of their respectively different focal areas, and the object of substantially all patented improvements in such lenses has been the formation of the differently curved surfaces with a sharply defined junction line between them; it being assumed that such aberration would be minimized in correspondence with the sharpness of such junction lines. However, such aberration is due to the formation of double, relatively displaced, images of every object seen through the linear junctions of said different focal areas due to the abrupt juxtaposition of the edges thereof in such angular relation as to produce a prismatic effect, and the formation of such double images is neither prevented nor minimized by the sharpening of the junction lines which has been the object of the prior art. Such aberration is particularly objectionable in vision which is downcast to the degree necessary to descend stairs, because such aberration is then manifested by double vision of the successive steps, making it impossible for the wearer of such lenses to precisely determine the location of the edges of the step treads; and the danger of such lenses under such circumstances is recognized in text books relating to the art of fitting such lenses, which instruct that purchasers of such lenses should be cautioned to avoid dependence upon vision through them under such circumstances.

It is the object of my invention to avoid the objections aforesaid with reference to ordinary lenses intended for bifocal vision, by providing lenses with a multifocal surface which is smoothly continuous from the top to the bottom thereof although of different dioptric curvature in different regions, so that the upper portion affords the proper correction for distant vision and the lower portion affords the proper correction for near vision and the region between the two extremes is of an intermediate curvature; the advantage of such construction and arrangement being that vision through any portion of said surface affords a single continuous visual image, instead of the double, relatively displaced, images which are characteristic of the bifocal lenses of the prior art.

My invention includes the various novel features of construction and arrangement hereinafter more definitely specified.

In the drawing; Figure I is a side elevation of a lens embodying my invention, having a curved surface which is smoothly continuous from top to bottom thereof and generated on an axis normal to that surface at the lower edge thereof and indicated at *x*.

Fig. II is a side elevation of a lens, similar to Fig. I, but indicating that the axis of generation of its curved surface is considerably below the lower edge thereof.

Fig. III is a side elevation of a lens, similar to Fig. I, but indicating that the axis of generation of its curved surface is between the horizontal meridian and the lower edge of said surface.

Fig. IV is a vertical sectional view of a lens such as shown in Fig. I, taken in a plane which is radial to the axis of generation of the curved surface at the right hand side of Fig. IV; said axis being normal to that surface at the point marked *x* in Fig. I. That side of said lens includes spherically curved surfaces of different dioptric power respectively above and below its horizontal meridian and merged in an intermediate zone which is otherwise curved, Fig. V is a vertical sectional view of a lens, similar to Fig. IV except that its multifocal concave curved surface, although of different dioptric power respectively above and below its horizontal meridian, has no spherically curved region.

Fig. VI is a vertical sectional view of such a lens as shown in Fig. III, in which the multifocal curved surface is convex.

Fig. VII is a vertical sectional view of the lens shown in Fig. I; with a diagrammatic indication of the relative location of the centers of curvature upon the axis of generation of the multifocal curved surface to which said axis is normal at the point marked $x$.

The lens shown in Figs. I and IV is formed of a single piece of glass of uniform index of refraction, having one, concave, surface which is smoothly continuous throughout its area but of different dioptric curvature at different regions; the regions 1 and 2 respectively above and below the geometrical center of the lens being spherically curved and merged in an intermediate region 3 which may be spherically, parabolically, elliptically, hyperbolically or otherwise curved. As indicated by the dash lines, said region 3 is an arcual zone, and said surface, including said areas 1, 2 and 3, is entirely generated from a single axis of rotation normal to said surface at the lower edge thereof as indicated at X.

As indicated in Fig. VII, the centers of curvature of said areas 1 and 2 are respectively located at 8 and 9 on said axis of generation, and the radii normal to the surface at three equally spaced points on said area 3 are intersected by said axis at the points marked 10, 11 and 12 in said figure, equally spaced intermediate of said centers 8 and 9.

The lens shown in Fig. I has its major and minor areas 1 and 2 proportioned and disposed in a manner to meet the principal demand of the trade, at this time. However, there is a lesser demand for lenses having their major and minor areas 1 and 2 proportioned and disposed as respectively indicated in Figs. II and III, and therefore I have illustrated such embodiments of my invention. However, although it is usual to spherically curve the respective major and minor areas 1 and 2 in each of the forms of lenses which I have illustrated in Figs. I, II and III; it is to be understood that my invention may be embodied in a lens which has no truly spherical area. For instance, the lens shown in Fig. V has the respective major and minor areas 4 and 5, of different dioptric curvature, respectively above and below its geometrical and optical center and merging without linear division in the intermediate region 6 and without any spherical area, although said lens shown in Fig. V approximates in its shape and dioptric power the lens shown in Fig. IV in which the major and minor areas are respectively spherically curved.

Of course, the optical surface of multifocal curvature may be convex, instead of concave as indicated in Figs. IV and V; for instance as shown in Figs. III and VI where the respective major and minor areas 1 and 2 are spherically curved, and merged in the intermediate region 3, which may be spherically, parabolically, elliptically, hyperbolically or otherwise curved, said three areas being disposed in the relation shown in Fig. III; that is to say, the axis of generation which is common to all of said areas is normal to the center of the area 2.

Of course, such construction and arrangement as above described connote that, in each instance, the axis of generation of the multifocal lens surface is not only an axis of symmetry with reference to which the different areas or zones 1, 2, and 3, of such surface are disposed, but is the locus of the centers of said zones.

Although, I have illustrated my invention as embodied in ophthalmic lenses; it is to be understood that it may be embodied in lenses adapted for other purposes. For instance, such a lens as shown in Fig. VI may be placed at the front of a vehicle lamp to simultaneously afford the maximum illumination of the road both distally ahead and locally, laterally, immediately in front of the vehicle. Moreover, although I have illustrated my invention with reference to optical elements intended for maximum transmission of light and, consequently, having their refractive effect predominating their reflective effect; my invention is equally applicable to other optical elements whether refractors, or reflectors, or refracting reflectors. For instance, any of the elements illustrated may be provided with an opaque surface to form a refracting mirror, or a substantially total reflecting mirror, or, an opaque element may be provided with a surface curved in accordance with my invention to form a substantially total reflector. Such reflectors may, for instance, be placed behind the source of light in a vehicle lamp, to distribute the light both distally and locally, as above contemplated.

It may be observed that the multi-curved surface of each of the optical elements above described is generated by movement of a compound curve with reference to a circular directrix and an axis of generation concentric with the directrix not only distinct from but remote from the principal axis of said element.

Although the optical elements herein claimed may be made by any suitable means; I note that the multifocal surface thereof may be conveniently formed by rotary surfacing tools of the type claimed in my copending application Serial No. 32,259 filed June 5, 1915, to wit, a rotary surfacing tool having, in concentric relation to a common axis, differently curved annular abrading zones, in variable axially spaced relation.

Therefore, I do not desire to limit myself to the precise details of construction and arrangement herein set forth as it is obvious that various modifications may be made therein without departing from my invention as defined in the appended claims.

I claim:—

1. An ophthalmic lens formed of a single piece of glass of uniform index of refraction, having one surface which is smoothly continuous throughout its area but of different dioptric curvature at different regions; regions respectively above and below the geometrical center of the lens being spherically curved and merged in an intermediate region which is approximately parabolically curved; said surface being entirely generated from a single axis of rotation normal to said surface near one edge thereof; said axis intersecting all of the centers of spherical curvature of said surface.

2. An ophthalmic lens formed of a single piece of glass of uniform index of refraction, having one surface which is smoothly continuous throughout its area but of different dioptric curvature at different regions; regions respectively above and below the geometrical center of the lens being spherically curved and merged in an intermediate region which is otherwise curved; said surface being entirely generated from a single axis of rotation normal to said surface near one edge thereof; said axis intersecting all of the centers of spherical curvature of said surface.

3. An ophthalmic lens formed of a single piece of glass of uniform index of refraction, having one surface which is smoothly continous throughout its area but of different dioptric curvature at different regions; regions respectively above and below the geometrical center of the lens being spherically curved and merged in an intermediate region which is otherwise curved; said surface being entirely generated from a single axis of rotation normal to said surface; said axis intersecting all of the centers of spherical curvature of said surface.

4. An ophthalmic lens formed of a single piece of glass of uniform index of refraction, having one surface which is smoothly continuous throughout its area but of different dioptric curvature at regions respectively above and below the optical center of the lens; said regions being merged in an intermediate region which is approximately parabolically curved; said surface being entirely generated from a single axis of rotation normal to said surface near one edge thereof; said axis intersecting all of the centers of spherical curvature of said surface.

5. An ophthalmic lens formed of a single piece of glass of uniform index of refraction, having one surface which is smoothly continuous throughout its area but of different dioptric curvature at regions respectively above and below the optical center of the lens; said regions being merged in an intermediate region which is approximately parabolically curved; said surface being entirely generated from a single axis of rotation normal to said surface.

6. An ophthalmic lens formed of a single piece of glass of uniform index of refraction, having one surface which is smoothly continuous throughout its area but of different dioptric curvature at regions respectively above and below the optical center of the lens; said regions being merged in an intermediate region which is approximately parabolically curved; said axis intersecting all of the centers of spherical curvature of said surface.

7. A single piece of glass having one entire surface curved with reference to a single axis of generation near one edge thereof but with zones of different dioptric powers at different distances from said axis, which is the common axis of said zones; said zones merging into each other.

8. A single piece of glass having one entire surface curved with reference to a single axis of generation but with zones of different dioptric powers, curved in arcs of circles in planes containing said axis, and at different distances from said axis, which is the common axis of said zones; said zones merging into each other.

9. A single piece of glass having one entire surface curved with reference to a single axis of generation near one edge thereof but with zones of different dioptric powers at different distances from said axis; said zones merging into each other.

10. A single piece of glass having one entire surface curved with reference to a single axis of generation but with zones of different dioptric powers, curved in arcs of circles in planes containing said axis, and at different distances from said axis; said zones merging into each other.

11. An optical element having one surface curved with reference to a single axis of generation near one edge thereof but with zones of different dioptric powers at different distances from said axis; said zones merging into each other.

12. An optical element formed of a single piece having one entire surface curved with reference to a single axis of generation but with spherical zones of different dioptric powers at different distances from said axis; said zones merging into each other.

13. An optical element having one entire surface curved with reference to a single axis of generation but with zones of different dioptric powers at different distances from said axis; said zones merging into each other.

14. An optical element formed of a single piece having one entire surface curved with reference to a single axis of generation but with zones of different dioptric powers at different distances from said axis; said zones merging into each other.

15. An ophthalmic lens formed of a single piece of glass of uniform index of refraction, having one surface which is smoothly continuous throughout its area including three zones; the inner and outer zones being of spherical curvature of respectively different radii, and the intermediate zone being a zone of transition from one of said spherical curvatures to the other without linear demarcation; all of said zones being symmetrically disposed with reference to a single axis of revolution.

16. An ophthalmic lens formed of a single pieve of glass of uniform index of refraction, having one surface which is smoothly continuous throughout its area, including three zones; the inner and outer zones being of spherical curvature of respectively different radii, and the intermediate zone being a zone of transition from one of said spherical curvatures to the other without linear demarcation; all of said zones being symmetrically disposed with reference to a single axis of revolution.

17. An ophthalmic lens formed of a single piece of glass of uniform index of refraction, having one surface which is smoothly continuous and concave throughout its area, including three zones; the inner and outer zones being of spherical curvature of respectively different radii, and the intermediate zone being a zone of transition from one of said spherical curvatures to the other without linear demarcation; all of said zones being symmetrically disposed with reference to a single axis of revolution.

18. An ophthalmic lens formed of a single piece of glass of uniform index of refraction, having one surface which is smoothly continuous and concave throughout its area, including three zones; the inner and outer zones being of different curvature, and the intermediate zone being a substantially parabolic zone of transition from one of said curvatures to the other without linear demarcation; all of said zones being symmetrically disposed with reference to a single axis of revolution.

In testimony whereof, I have hereunto signed my name at Philadelphia, Pennsylvania, this thirty-first day of March, 1915.

ARTHUR E. PAIGE.

Witnesses:
ANNA ISRAELVITZ,
MINNIE L. MAHLE.